(No Model.) 2 Sheets—Sheet 1.

A. F. & W. MEISSELBACH.
FISHING REEL.

No. 397,198. Patented Feb. 5, 1889.

Attest:
L. Lee.
F. C. Fischer.

INVENTORS
August F. Meisselbach
& William Meisselbach.
By Charles Miller, Attys (No Model.) 2 Sheets—Sheet 2.

A. F. & W. MEISSELBACH.
FISHING REEL.

No. 397,198. Patented Feb. 5, 1889.

Attest:
L. Lee.
F. C. Fischer.

INVENTORS.
August F. Meisselbach
& William Meisselbach
By Cramer Miller, Atty.

United States Patent Office.

AUGUST F. MEISSELBACH AND WILLIAM MEISSELBACH, OF NEWARK, NEW JERSEY.

FISHING-REEL.

SPECIFICATION forming part of Letters Patent No. 397,198, dated February 5, 1889.

Application filed October 27, 1888. Serial No. 289,322. (No model.)

*To all whom it may concern:*

Be it known that we, AUGUST F. MEISSELBACH and WILLIAM MEISSELBACH, both citizens of the United States, residing at Newark, Essex county, New Jersey, have invented certain new and useful Improvements in Fishing-Reels, fully described and represented in the following specification and the accompanying drawings, forming a part of the same.

The object of this invention is to provide a drag which may be so operated as to partially or wholly stop the movement of the reel at the will of the operator when casting the bait, and also to furnish a constant brake for the reel when desired.

The invention consists partly in the combination, with the spool, of a yielding band encircling the edges of the same and adapted to be pressed into contact therewith, and partly in an auxiliary braking device adapted to be disengaged at pleasure.

Heretofore a regulated braking device for use in casting the bait has been formed by providing the thumb of the operator with a thumb-stall, which was pressed directly upon the line wound upon the reel. As the line was always necessarily wound somewhat unevenly and presented an uneven surface for the thumb-stall to press against, a perfectly uniform pressure (and therefore a uniform resistance) upon the reel was not attainable with the use of such device.

In our invention, as the rim of the reel or spool to which the drag is applied is perfectly round and even, it is evident that a constant or uniformly-increasing pressure can be readily applied thereto at the will of the operator to retard or to entirely stop the rotation of the reel.

In order to avoid the necessity of applying the brake constantly to the reel to prevent the line from unwinding after the bait is properly thrown, we have devised an auxiliary braking device adapted to be thrown into contact with the reel, and which exerts a continuous pressure thereon while the principal brake or drag is disengaged.

Figure 1:
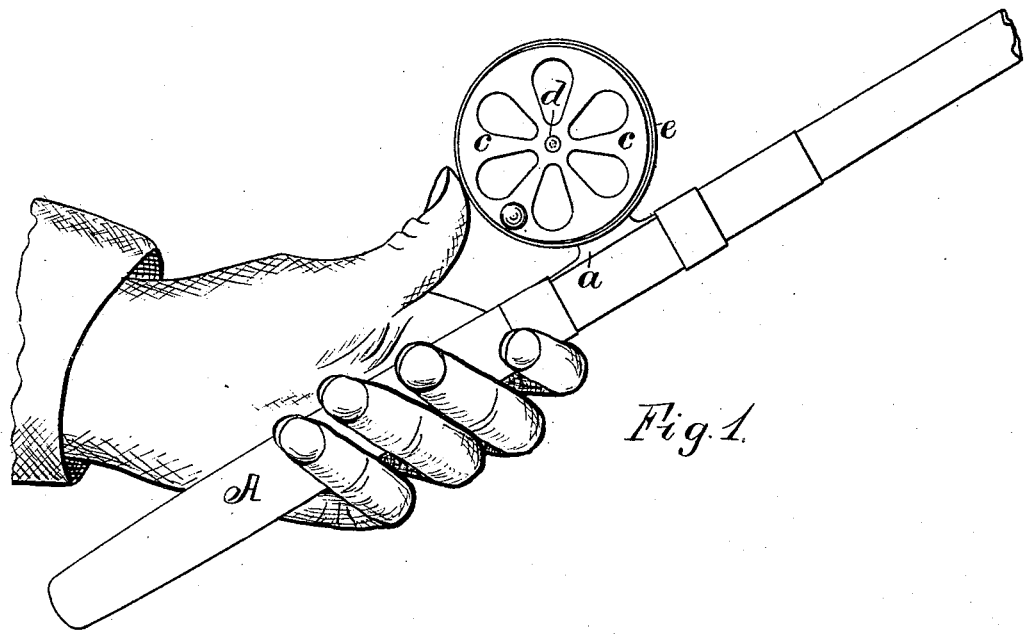
Figure 2:
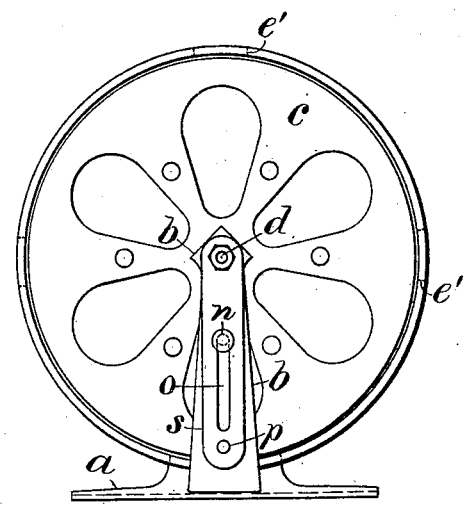
Figure 3:
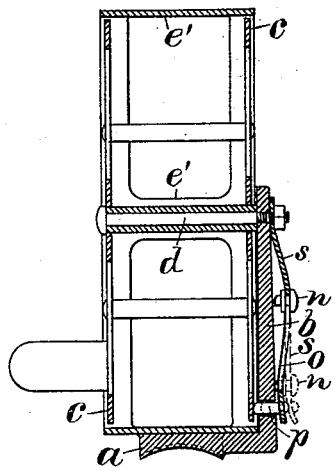
Figure 4:
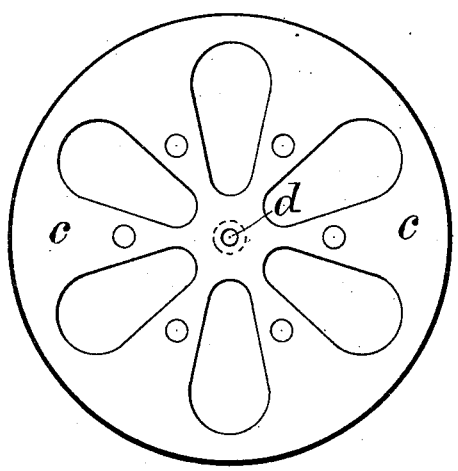
Figure 5:
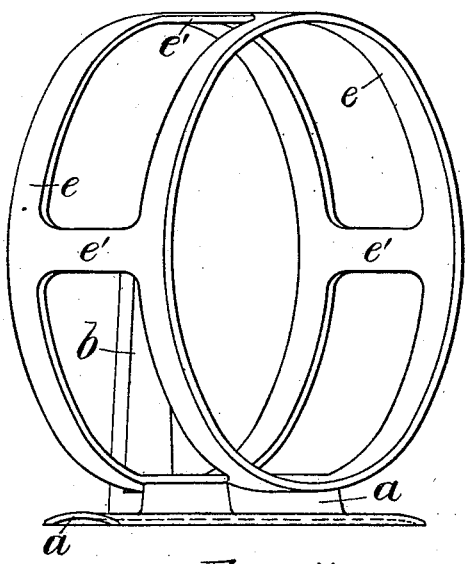

In the annexed drawings, Figure 1 is an elevation of the butt-end of a fishing-rod having a reel embodying our invention secured thereon, the rod being shown in the hand of the operator. Fig. 2 is an elevation of the opposite side of the spool from that shown in Fig. 1, drawn full size; and Fig. 3, a vertical transverse section of the same. Fig. 4 is a detached view of the spool, and Fig. 5 an oblique view of the combined drag and guard attached to the shoe or base of the reel. Figs. 4 and 5 are on a still larger scale than Figs. 2 and 3.

A is the fishing-rod, and $a$ the base or shoe of the reel secured thereto in the usual manner.

$b$ is a post projecting from one side of the base $a$ and forming the support for the reel proper or spool $c$ by means of the stud $d$ secured therein.

$e$ is the drag formed of a strip of hard or spring sheet metal to encircle the edges of the spool $c$ and in a ring of a little greater diameter than the periphery of the spool. In order to permit the free passage of the air to the line in drying the same, when wound upon the same, we cut out the middle portion of the sheet-metal strip or band composing the drag, leaving merely two narrow rims adjacent to the edges of the cheek-pieces of the spool, with cross-pieces $e'$ to tie the same together.

In Fig. 1 the drag is shown pressed into its operative position by the thumb of the operator, which rests against one of the cross-pieces $e'$, thus throwing the side nearest the thumb into contact with the periphery of the spool and its opposite side a corresponding amount farther from the periphery of the spool.

It will be seen that the construction of the drag as above described renders it equally serviceable as a guard for preventing the tangling of the line when slack with the other parts of the reel.

We have shown the drag herein as applied to a single-action reel; but it is evidently as readily adapted for application to a multiplier, and we do not therefore limit ourselves to any particular form of reel to which it may be applied.

Our auxiliary braking device or drag consists in an outwardly-bent leaf-spring, $s$, applied to the outer side of the post $b$, being secured at one end to the top of such post by means of the stud $d$, and having at its free end a pin, $p$, projecting inwardly therefrom and through an aperture near the base of the post toward the spool. The spring is bent so as to press the pin $p$ inwardly into contact with the cheek-piece of the spool nearest it. To prevent the continuous engagement of the inner end of the pin with the spool, we form a slot, $o$, in the spring near its free end, having a sliding button, $n$, therein. This button is so constructed and proportioned that when at one end of the slot its inner side will not touch the side of the post $d$, and the pin $p$ will be allowed to engage with the side of the spool $c$, as shown in full lines in Fig. 3; but when moved to the opposite end of the slot the free end of the spring will be retracted, thus withdrawing the pin $p$, as shown in dotted lines in Fig. 3.

It is evident that by bending the spring in a slightly-different manner from that shown in the drawings the effect of the movement of the button $n$ in the slot $o$ might be made to produce the reverse effect from that produced by the arrangement shown herein. Thus if the pin $p$ were made a little longer and the spring bent so that its free end were farthest away from the post $d$ the movement of the button away from the pin $p$ would disengage the pin from the spool $c$, and a corresponding movement of the button toward the pin would serve to throw the latter inward into contact with the spool. We do not therefore limit ourselves to the particular form to which the spring is bent.

It is obvious that the form of the support for the spool-stud is entirely immaterial to our invention, which is wholly independent of the construction of the other parts of the reel.

We are aware of United States Patent No. 41,494, showing a drag operated by the thumb; but our invention differs from the same in consisting in an elastic cylindrical shell, serving as a guard for the spool, as well as a drag or brake. We are also aware of United States Patents Nos. 246,147 and 318,190; but in the constructions shown therein the spring operating as a drag is unprovided with a slot having a button sliding therein to throw the drag into and out of contact with the spool, as in our construction. We hereby disclaim the said patents.

Having thus set forth the nature of our invention, what we claim herein, and desire to secure by Letters Patent, is—

1. In a fishing-reel, the combination, with the spool, of a combined drag and guard, consisting in a yielding cylindrical shell encircling the flanges of the spool, with its inner face adjacent to their peripheries, and adapted, when pressed by the operator, to make a frictional contact with the rotating flanges, substantially as shown and described.

2. In a fishing-reel, the combination, with the support of the spool-stud and the spool, of the leaf-spring $s$, secured at one end to the said support, and having at its opposite end an inwardly-projecting pin, $p$, the said spring being provided with a slot, $o$, having a sliding button therein and inclined in relation to the said support for the spool-stud, as and for the purpose set forth.

In testimony whereof we have hereunto set our hands in the presence of two subscribing witnesses.

AUGUST F. MEISSELBACH.
WILLIAM MEISSELBACH.

Witnesses:
L. LEE,
H. J. MILLER.